March 16, 1937.   F. N. PARRISH   2,073,708
ROLLER SKATE
Filed June 5, 1935

INVENTOR.
Frank N. Parrish
BY
ATTORNEY.

Patented Mar. 16, 1937

2,073,708

UNITED STATES PATENT OFFICE 2,073,708

ROLLER SKATE

Frank N. Parrish, Silver City, N. Mex.

Application June 5, 1935, Serial No. 25,013

4 Claims. (Cl. 208—181)

This invention relates to roller skates and has for its object to provide an improved construction therefor which will give quiet operation, better exercise to the ankles, reduction in fatigue by a wearer, an inherently greater safety against lateral slippage, and hence which will encourage greater use.

More particularly, it is the object of this invention to provide a roller skate equipped with pneumatic tires with provision for easy assembly and disassembly with its rim onto the skate.

It is a specific object to provide an improved wheel assembly suitable for roller skates, stretchers, undertakers' trucks, scooters and the like where the advantages herein recited are applicable and which includes a pneumatic tire, an axle, and a tire supporting structure therebetween in which the wheel proper has been eliminated. In this way, the maximum space is available for the pneumatic tire and the overall height is kept low for improved appearance and for greater safety against overturning. This wheel assembly is suitable for use particularly to children.

Another specific object is to provide an improved antifriction bearing assembly, one race of the bearing comprising the exterior surface of the tire retaining rim, the other race being carried by the axle.

Another object is to provide a hub portion of identical diameter with the inside diameter of the tire and to so place the bearings with respect thereto that lateral thrust by the tire imposes a straight line thrust on said bearings.

A further object is to provide a two part rim construction with the parts being insertable partially through the tire from opposite sides and to employ the tire as a rim alining means thereby reducing the manufacturing cost to a minimum.

Other objects and advantages either directly described or indirectly accruing from the favorable arrangement of parts will become hereinafter more fully apparent as reference is had to the accompanying drawing wherein my invention is illustrated by way of example and in which—

Figure 1:
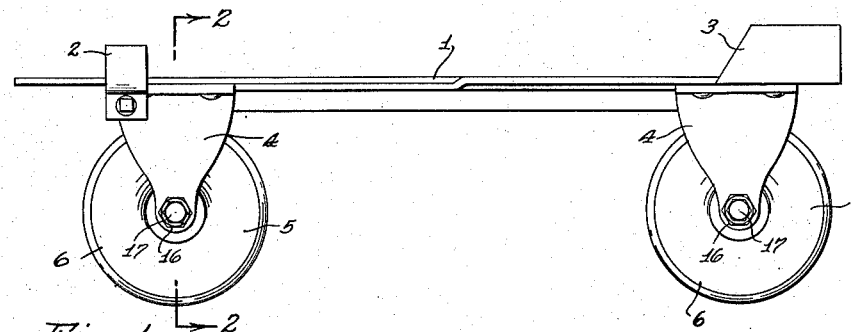
Figure 2:
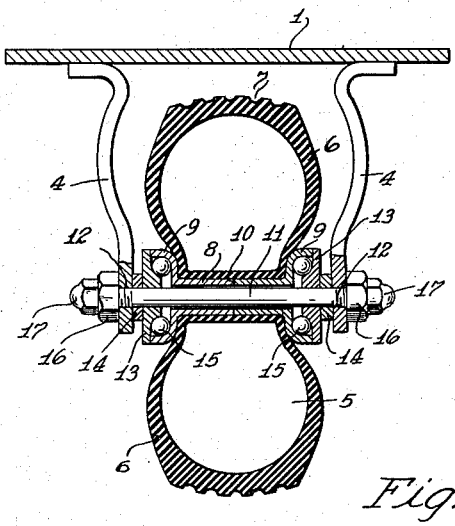

Figure 1 is a side elevation of a roller skate constructed in accordance with my invention, and Fig. 2 is a transverse section taken along the line 2—2 of Figure 1 showing the wheel make-up.

More particularly, 1 indicates the platform of a roller skate adapted to receive the foot of a wearer, the toe clamps 2 and heel receiver 3 positioning the foot thereon. Depending from the front and rear of the platform 1 are pairs of brackets or fork members 4 which support the platform from front and rear wheels 5. Both wheels 5 are of the same construction so that the description which follows applies to both.

Each wheel assembly is composed of a pneumatic tire 6, preferably with a non-skid tread 7 and of the completely closed type wherein an inner tube is unnecessary. The inflating may be accomplished by needle injection or in any suitable manner as is well understood. This tire is positioned on a cylindrical rim 8 having flanges 9 arising from each outer edge thereof as retaining means for the tire. The cylindrical member 8 is preferably of two part construction or split at its midsection 10 so that the tire 5 will not have to be stretched over a flange 9.

The rim portion 8 serves also as a wheel hub. An axle 11 is inserted through eyes 12 in the lower ends of the forks 4 and through this hub, the hub being of larger diameter than the axle so that it does not have bearing contact therewith. The exterior surfaces of the flanges 9 constitute ball races and a conical member 13 is placed opposite each flange to constitute the other ball race. Spacer members 14 are inserted between the conical members 13 and the brackets 4, and balls 15 complete the bearing assembly.

The axle 11 is threaded at one or each end and positioned and locked by the nuts 16 and locknuts 17.

Various slight changes may be made without departing from the spirit of my invention and I therefore desire to be extended protection within the scope of the appended claims wherein:

What I claim is:

1. A wheel comprising a rim, said rim having a cylindrical portion and flanges arising from each edge thereof, the exterior surface of said cylindrical portion constituting a tire receiving means, said flanges having curved interior and exterior surfaces terminating in cylindrical ends with the interior surfaces thereof constituting ball races for an anti-friction bearing from which the wheel is supported, the exterior surfaces of said flanges constituting the sole means for retaining said tire on said rim, said cylindrical portion also constituting a wheel hub, the inside diameter of said tire being substantially less than the overall diameter of said bearing whereby said hub is of minimum outside diameter, the cylindrical ends of said flanges each being exposed to view.

2. In a roller skate wheel assembly, a pneumatic tire, a rim comprising a cylindrical portion and flanges integral with and arising from the outer edges of said cylindrical portion, said cylindrical portion being divided diametrically and intermediate the ends thereof whereby one of said flanges and its corresponding rim portion is demountably inserted from one side of the tire and the other flange and its rim portion is demountably inserted into the other side of the tire to constitute a complete tire and rim assembly, and means for retaining all parts in operative assembly.

3. In a roller skate wheel assembly, a pneumatic tire, a rim comprising a cylindrical portion and flanges integral with and arising from the outer edges of said cylindrical portion, said cylindrical portion being split intermediate the ends thereof whereby said ends are oppositely removable from said tire, an axle insertable through said rim whereby said rim constitutes a wheel hub, and bearings between said rim and said axle, said tire after inflation constituting the means for retaining the two parts of said cylindrical portion against relative rotation.

4. In combination in a roller skate, a split rim for a tire with each part thereof comprising a tire retaining flange and a cylindrical tire supporting portion, an axle of slightly less diameter than the diameter of said cylindrical portion insertable therethrough whereby said rim also constitutes a wheel hub, the surfaces of said flanges outwardly of said tires constituting ball races, mating ball race members carried directly by said axles having peripheral portions in contact with the outer edges of said flanges constituting a dust shield for said bearings, balls between said races and said race members, and bracket members in which the ends of said axle are positioned, said brackets comprising means for maintaining said bearings in operative assembly and for urging the two parts of said hub into substantially abutting relation, said tire and said bearings comprising means to maintain the parts of said hub in co-axial alinement on said axle.

FRANK N. PARRISH.